US012430095B2

(12) United States Patent
Grady et al.

(10) Patent No.: US 12,430,095 B2
(45) Date of Patent: *Sep. 30, 2025

(54) DYNAMIC NETWORK IDENTIFICATION

(71) Applicant: Comcast Cable Communications, LLC, Philadelphia, PA (US)

(72) Inventors: Daniel T. Grady, Audubon, NJ (US); Phillip A. Gabler, Doylestown, PA (US); Arvind Mundra, Downingtown, PA (US); Yan Sperling, Holland, PA (US); Daniel Hillegass, Warrington, PA (US); Paul Davis, Philadelphia, PA (US); Nishant Doshi, Norristown, PA (US); Earl A. Crenshaw, Burlington, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,462

(22) Filed: Sep. 8, 2022

(65) Prior Publication Data

US 2023/0251815 A1 Aug. 10, 2023

Related U.S. Application Data

(63) Continuation of application No. 16/881,840, filed on May 22, 2020, now Pat. No. 11,474,772.

(51) Int. Cl.
*G06F 3/16* (2006.01)
*G10H 1/00* (2006.01)
(Continued)

(52) U.S. Cl.
CPC ........... *G06F 3/165* (2013.01); *G10H 1/0083* (2013.01); *G10L 19/167* (2013.01); *H04W 76/11* (2018.02)

(58) Field of Classification Search
CPC ...... H04W 76/11; G06F 3/165; G10L 19/167; G10H 1/0083
See application file for complete search history.

(56) References Cited

U.S. PATENT DOCUMENTS

2013/0091239 A1* 4/2013 Hao ..................... H04L 65/762
709/217
2013/0182846 A1* 7/2013 Yamada ............... H04W 12/02
380/270

(Continued)

*Primary Examiner* — Phung-Hoang J Nguyen
(74) *Attorney, Agent, or Firm* — Banner & Witcoff, Ltd.

(57) ABSTRACT

Systems, apparatuses, and methods are described for a dynamic network identification to facilitate a selection of a desired audio. A premises (e.g., a public bar) may have a plurality of display devices (e.g., television screens) outputting videos associated with a plurality of content items (e.g., television programs). A computing device may assign an audio data of each of the content items to be transmitted over a separate wireless network. A user may be able to listen to the audio of a desired content item by causing a user device to join a wireless network assigned to transmit an audio data of the desired content item. The wireless network may be reused to transmit a different audio data. A network identifier of the wireless network may be renamed to indicate the different audio data. The network identifier may be based on metadata associated with a content item.

18 Claims, 9 Drawing Sheets

(51) Int. Cl.
    *G10L 19/16*   (2013.01)
    *H04W 76/11*   (2018.01)

(56) References Cited

U.S. PATENT DOCUMENTS

2015/0067536 A1* 3/2015 Leorin .................. H04W 12/06
                                                    715/753
2017/0099184 A1* 4/2017 Oommen ............ H04L 41/0809
2018/0131897 A1  5/2018 Gehring et al.
2018/0146327 A1* 5/2018 Moshfeghi ............ G01S 5/0236
2019/0124401 A1* 4/2019 Lentner .............. H04N 21/4856

* cited by examiner

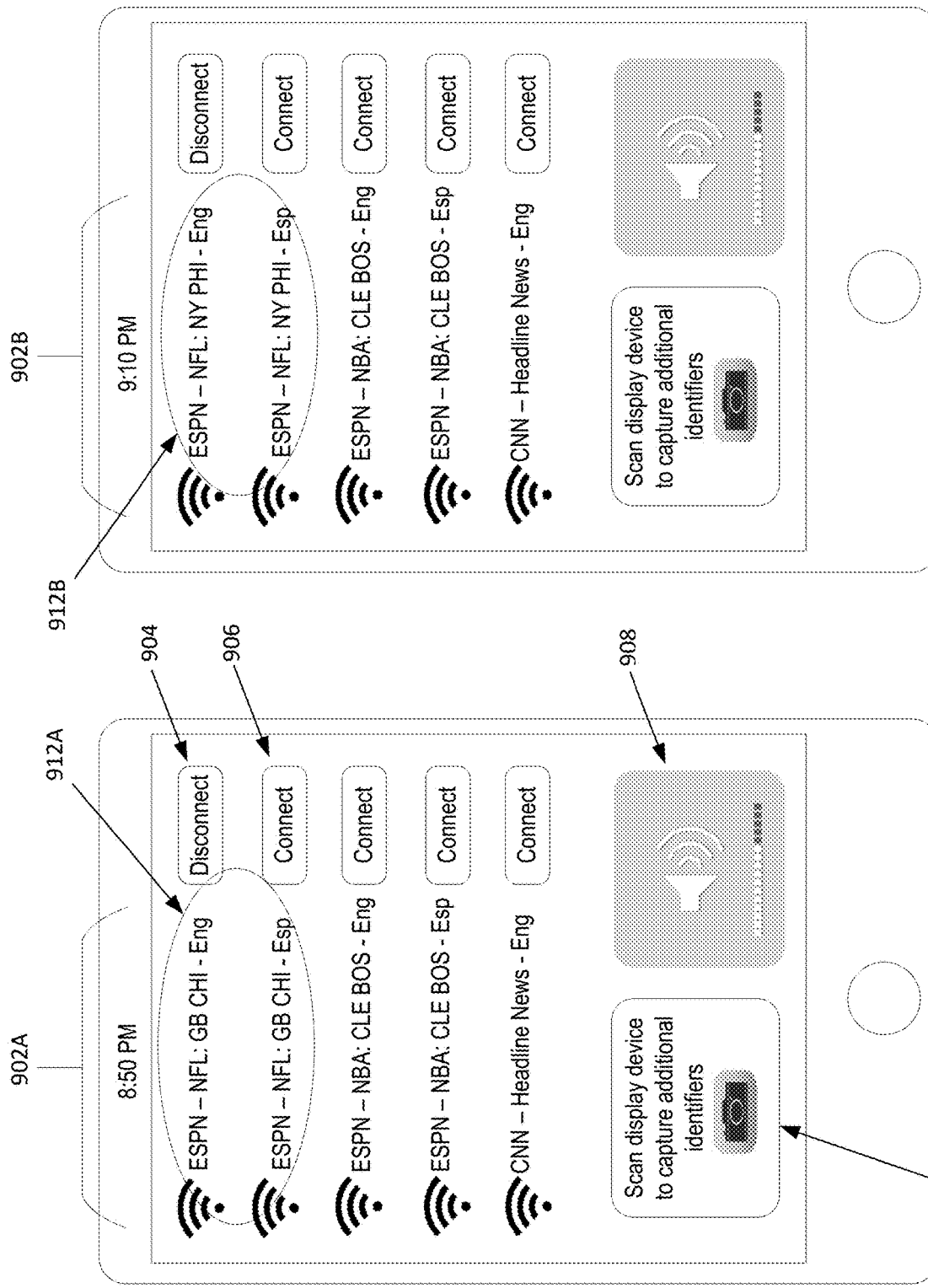

DYNAMIC NETWORK IDENTIFICATION

CROSS-REFERENCE TO RELATED APPLICATIONS

This application is a continuation of and claims priority to U.S. patent application Ser. No. 16/881,840, filed May 22, 2020, which is hereby incorporated by reference in its entirety.

BACKGROUND

Various public venues, such as bars, may present multiple video content items via one or more devices (e.g., television screens). However, output of the audio components for one or more of the video content items may be muted or turned down. For example, simultaneous output of audio for multiple content items may confuse and/or overwhelm persons in the public venue. A person may desire to hear the audio of one of the multiple content items while the person is inside the public venue. However, the person may not want to stand near a device to be able to hear the audio, and/or may not want the device to disturb other persons in the public venue. The person may also want an effective way to identify audio associated with a desired content item. These and other shortcomings are identified and addressed by the disclosure.

SUMMARY

The following summary presents a simplified summary of certain features. The summary is not an extensive overview and is not intended to identify key or critical elements.

Systems, apparatuses, methods, and non-transitory computer readable media are described for a dynamic network identification to facilitate a selection of an audio data track. A computing device (e.g., a main display device (e.g., a master display device), a set-top box, a digital video recorder (DVR), an audio transmission device, an external system, etc.) may cause one or more display devices (e.g., televisions) to output video for content items (e.g., television shows), and for which audio may be muted or output at very low volume. Each content item may comprise video data and one or more tracks of audio data associated with the video data. A plurality of wireless networks may transmit (e.g., broadcast) the one or more audio data tracks associated with the video data for each of the one or more content items. The computing device may generate a plurality of identifiers for the plurality of wireless networks transmitting the one or more audio data tracks. As each content item may be replaced by a new content item, a corresponding new identifier may be generated for a wireless network of the plurality of wireless networks. The identifiers may be generated based on metadata associated with the one or more content items. A person in the public venue may desire to listen to the audio for one of the content items displayed on one of the one or more display devices. The person may send, via his or her user device, an indication of a selection of an identifier from the plurality of identifiers that corresponds to an audio data track for the desired audio. The computing device may allow the user device access to the track of audio data corresponding to the selected identifier, via the wireless network associated with the selected identifier.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 8, 9A and 9B show example user interfaces of a user device used to select and access audio using dynamic network identification.

DETAILED DESCRIPTION

Figure 1:
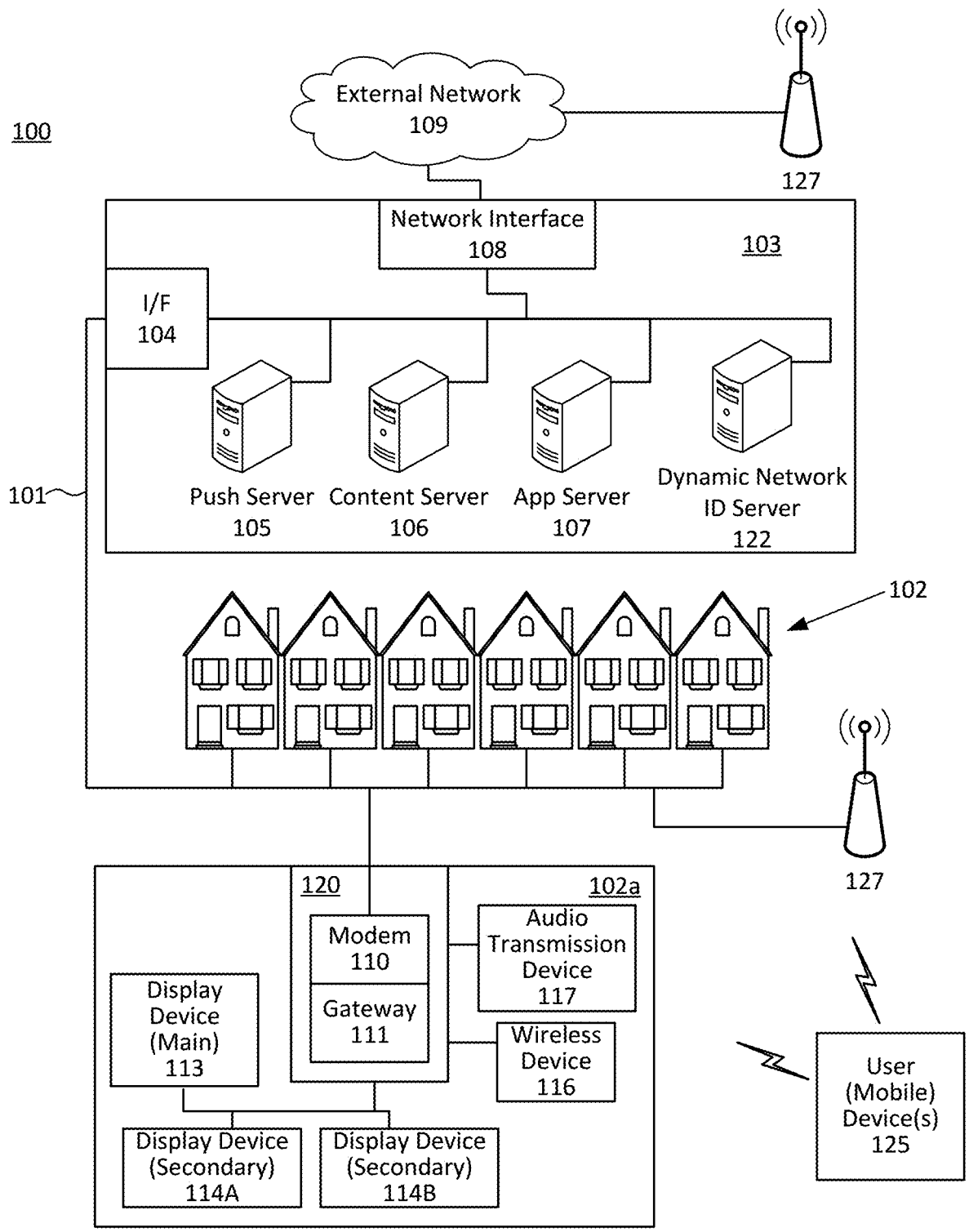
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., bars, businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein. The devices may comprise, for example a set top box (STB) and/or a digital video recorder (DVR) (e.g., STB/DVR 112) and a plurality of display devices (e.g., display devices 113 and 114A-114B) that may display different content items (e.g., television programs). Also or alternatively, a single display device may display multiple content items, e.g., by partitioning its display area. As will be described further herein, the plurality of display devices may have their audio muted or may have the volume of their audio turned low in accordance with the environment of the premises 102. One of the display devices (e.g., the display device 113) ("main display device") may control one or more functions of the other display devices (e.g., the display devices 114A-114B) ("secondary display device(s)"). Also or alternatively, a system or subsystem that is distinct from the display devices (e.g., an audio data transmission device 117) may control access to audio data tracks of different content items.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more user devices 125 (e.g., mobile devices of users) via one or more wireless networks. The user devices 125 may comprise smart phones, tablets or laptop computers with wireless transceivers, tablets or laptop computers communicatively coupled to other devices with wireless transceivers, and/or any other type of device configured to communicate via a wireless network. For example, the user devices 125 may be associated with users who enter the one or more premises 102. The users may view content displayed on the plurality of display devices and may desire to listen to the audio of the content being displayed. As described below in connection with FIGS. 5 and 6, the audio transmission device 117 may facilitate access to the desired audio of the content being displayed.

The local office 103 may comprise an interface 104. The interface 104 may comprise one or more computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the user devices 125 via the interface 108 and one or more of the external networks 109, e.g., via one or more of the wireless access points 127.

The push notification server 105 may be configured to generate push notifications to deliver information to devices in the premises 102 and/or to the user devices 125. The content server 106 may be configured to provide content to devices in the premises 102 and/or to the user devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., tracking) of the content. One or both of the push server 105 and the content server 106 may deliver advertisements to the user devices 125. The advertisements may be based on the location of the user device 125 or on the content that the user device may have tuned to. One or more application servers 107 may be configured to offer any desired service. For example, the application servers 107 may be responsible for facilitating the delivery of content items (e.g., video data tracks, audio data tracks, etc.) to the devices of a premises.

Furthermore, the application servers 107 may be responsible for monitoring user devices present within a vicinity of each premise, collecting information from the user devices, and processing requests to tune to an audio data track. Furthermore, the application servers 107 may be responsible for formatting and inserting audio data tracks and/or video data tracks so that they are synchronized with one another, and transmitting audio data tracks to the user devices 125. The local office 103 may comprise additional servers, such as the dynamic network identification (ID) server 122 (described below), additional push, content, and/or application servers, and/or other types of servers. Although shown separately, the push server 105, the content server 106, the application server 107, the dynamic network ID server 122, and/or other server(s) may be combined. The dynamic network ID server 122, and/or one or more of the servers 105, 106, and/or 107, may perform methods for a dynamic network identification to facilitate a selection of an audio data track from a plurality of audio data tracks. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., the display devices 113 and 114A-114B (e.g., televisions), and wireless devices 116 (e.g., wireless routers, wireless laptops, notebooks, tablets and netbooks, mobile televisions, and any other desired devices). The various display devices may comprise a main display device 113 and one or more secondary display devices (e.g., the display devices 114A-114B). The main display device 113 may control some of the functions of one or more secondary display devices, such as the content items displayed by each display device. As will be explained further below, one of a plurality of display devices may be designated as a main display device based on its signal strength. The audio transmission device 117 may facilitate access to audio data associated with the content items displayed by the plurality of display devices.

Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth, etc.), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the user devices 125, which may be on- or off-premises.

The user devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
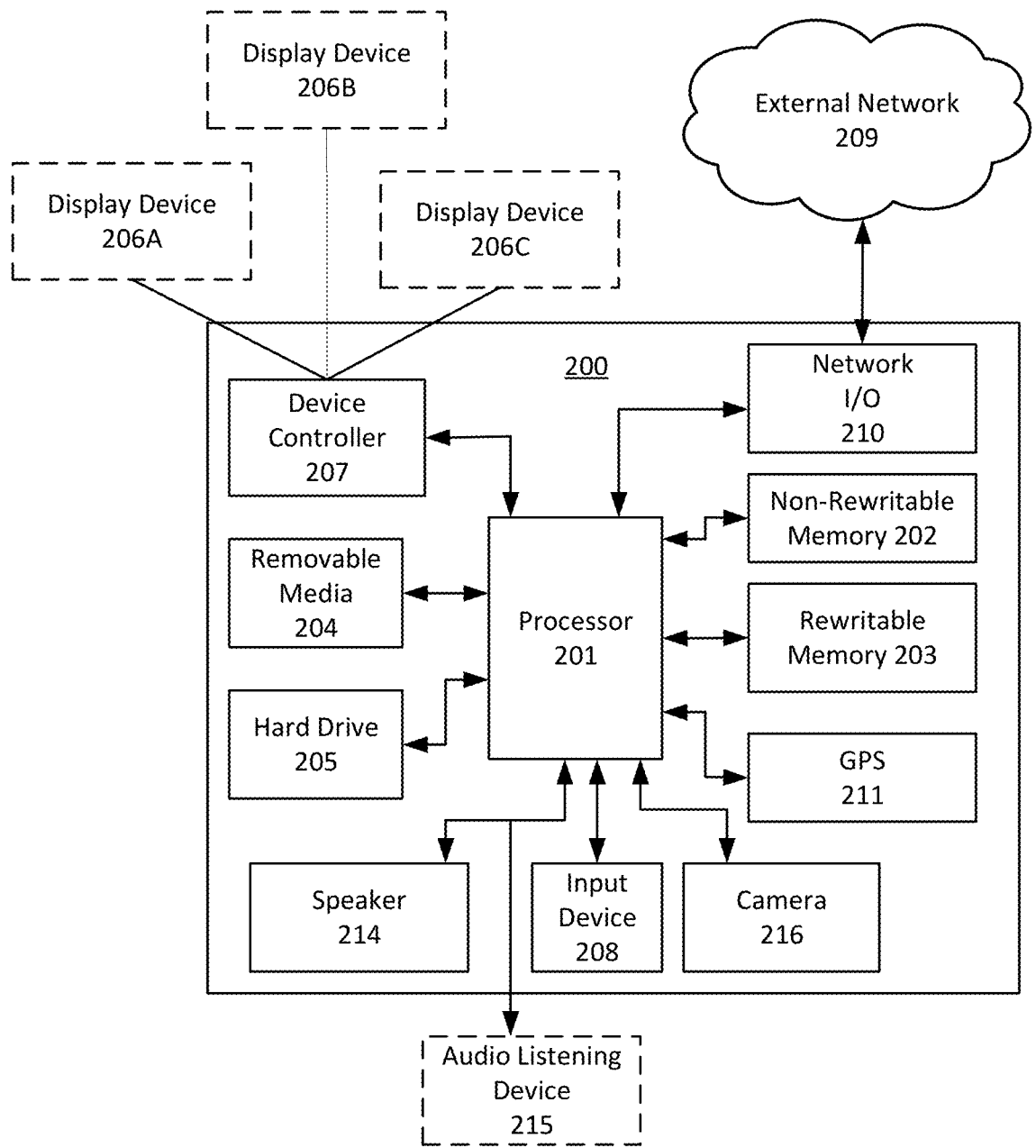
FIG. 2 shows an example computing device.

FIG. 2 shows hardware elements of a computing device 200 that may be used to implement any of the computing devices shown in FIG. 1 (e.g., the user devices 125, any of the devices shown in the premises 102*a* (e.g., the display devices 113 and 114A-114B, audio transmission device 117), any of the devices shown in the local office 103, any of the wireless access points 127, any devices with the external network 109) and any other computing devices discussed herein (e.g., the dynamic network ID server 122, the content receiver(s), etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media.

The computing device 200 may comprise one or more output devices, such as one or more display devices 206A-206C (e.g., an external television and/or other external or internal display device) and a speaker 214, and may comprise one or more output device controllers 207, such as the audio transmission device 117, a video processor, or a controller for an infra-red or BLUETOOTH transceiver. For example, the gateway 111 or the main display device 113 may control the output of one or more display devices 206A-206C via the device controller 207. If a computing device 200 is a main display device used to control the output of other display devices (and/or of displays associated with other computing devices), those other computing devices and/or displays may be referred to as secondary display devices, such as the secondary display devices 114A-114B. Also or alternatively, one or more of the audio transmission device 117 or the one or more display devices 206A-206C may be external to the computing device 200, and may be communicatively associated with the computing device 200.

A display device, such as display devices 206A-206C, may be a standalone computing device (e.g., a television, a smart monitor, etc.) that may include a visual display (e.g., a liquid crystal display (LCD) screen, an organic light emitting diode (OLED) display, a plasma display, etc.) along with the other components described above (e.g., processor, memory, etc.). The outputting function of the display device may be performed at the visual display. The visual display may be an internal and/or external component of the display device, or may be communicatively linked to the display device. A "display device" may refer, for example, to a visual display that outputs video associated with content items, and/or to a computing device (e.g., a television, smart monitor, etc.) that includes the visual display as a component.

One or more user input devices 208 may comprise a remote control, a keyboard, a mouse, a touch screen (which may be integrated with the display devices 206A-206C), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network.

A computing device 200 may comprise a location-detecting device, such as a global positioning system (GPS) microprocessor 211, which may be configured to receive and process global positioning signals and determine, with possible assistance from an external server and antenna, a geographic position of the device 200. For example, a GPS of user device 125 may be used to determine that the user device 125 is within a premises 102*a*. For example, the GPS of the user device 125 may be used to determine the display devices within the vicinity of the user device. The vicinity may be based on a circular region formed by a radius distance from the user device 125 and/or from another device (e.g., the main display device 113, the gateway 111, the audio transmission device 117, etc.). As discussed previously, the display devices within the vicinity of the user device 125 may be displaying content items (e.g., television programs). The output of audio for the content items may be muted or have a low audio volume. Also or alternatively, the main display device 113, the audio transmission device 117, or the set top box/DVR 112 of the premises 102 may be detected by the user device 125 via a GPS 211. The user device 125 may obtain, for example, from the computing device 200 (e.g., the audio transmission device 117, the main display device 113, and/or the dynamic network ID server 122), identifiers for various audio data tracks that a user may select. For example, the audio transmission device 117 may determine the various content items being displayed by the plurality of display devices at the premises 102, determine the audio data tracks for each of the various content items, and generate identifiers for each audio data track for the user to select.

A computing device 200, for example, the user device 125, may include a camera 216. The camera 216 may be used to capture or scan a visual output of a content item (e.g., a screenshot of the television program) for which a user is interested in receiving the audio data for the content item. The scanned or captured visual output of the content item may reveal an indicator that could be used to access the audio data according to methods that will be described herein. Also or alternatively, the scanned or captured visual output of the content item may cause the user device 125 to initiate an augmented reality session via a user interface of the user device 125.

One or more computing devices 200 may be located within or otherwise associated with a premises. Each of the one or more computing devices associated with a premises may comprise one or more devices of the premises shown in the premises 102a of FIG. 1 (e.g., the gateway 111, the audio transmission device 117, the display devices 113 and/or 114A-114B, the wireless devices 116, etc.). A computing device 200 may comprise the user device 125 associated with a user of the premises. A computing device 200 comprising the user device 125 may be configured to connect with an audio listening device (e.g., earbuds, headphones, speakers, etc.) 215 or other accessories that permit a user to hear audio generated from an audio data track selected by the user. A computing device 200 may comprise one or more of the servers of the local office 103 (e.g., the push server 105, the content server 106, the application servers 107, or the dynamic network ID server 122).

Using a processor 201, a computing device 200 may perform various steps discussed below. Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
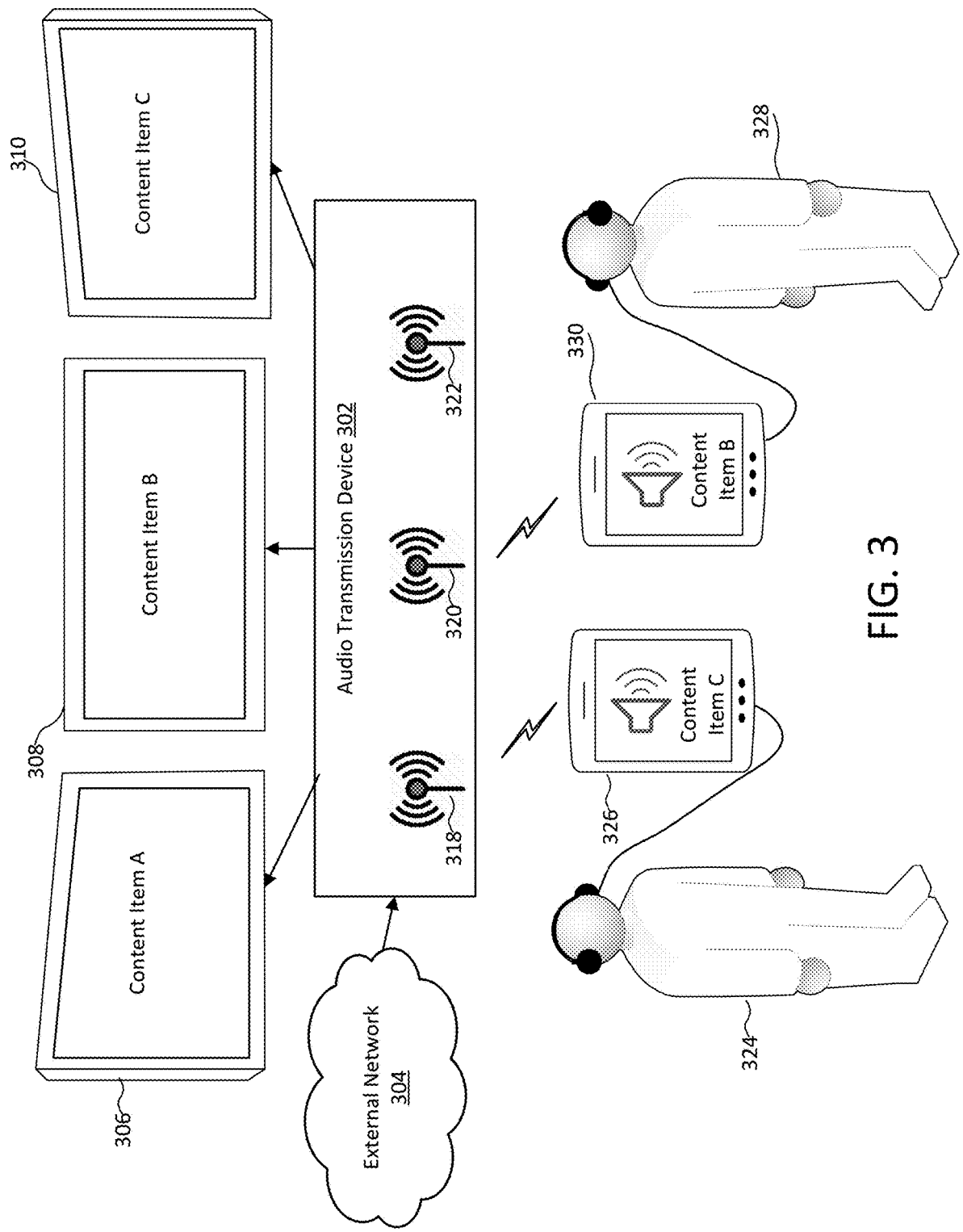
FIG. 3 shows an example system for dynamic network identification to facilitate a selection of audio data.
Figure 4:
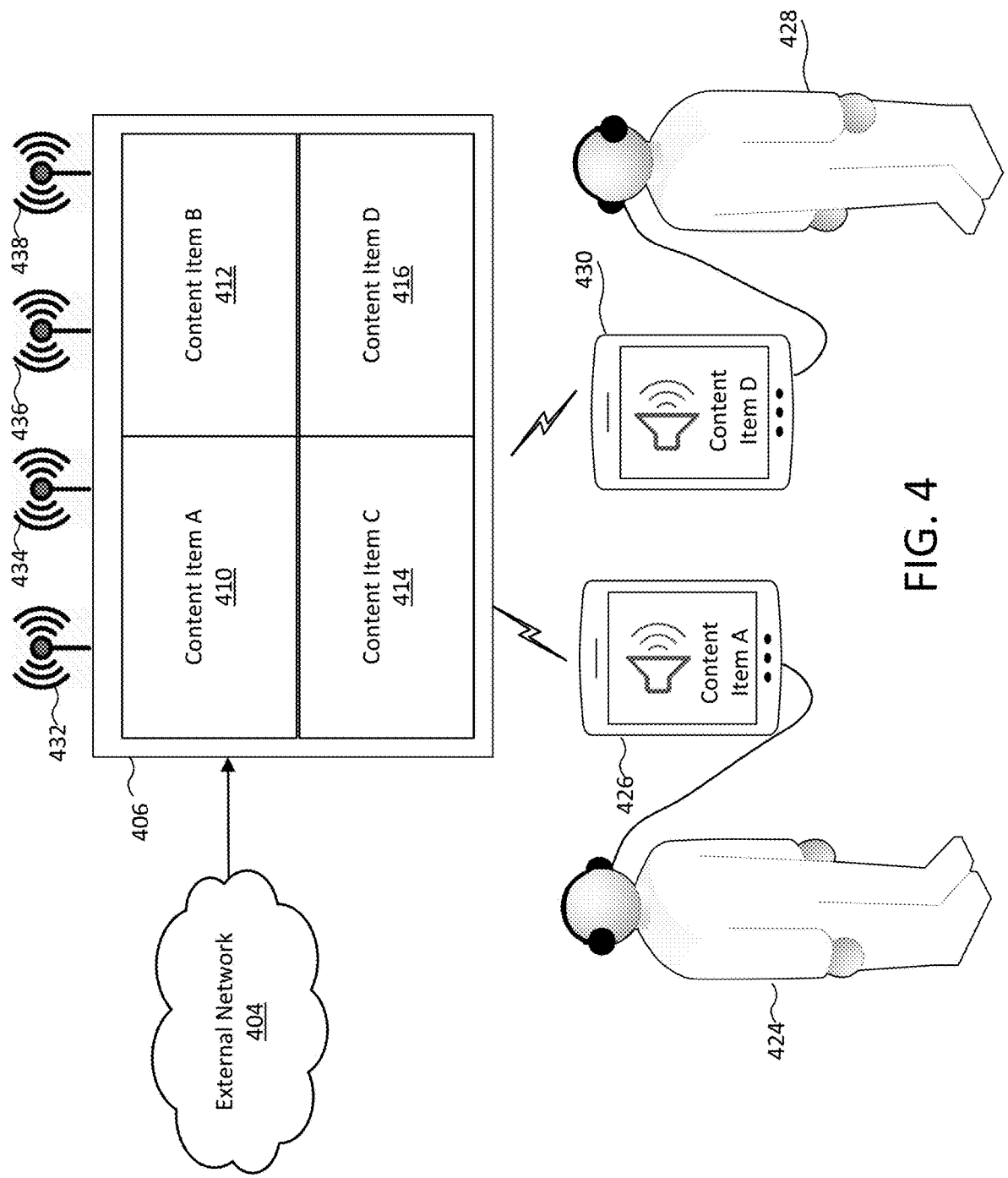
FIG. 4 shows another example system for dynamic network identification to facilitate a selection of audio data.

FIGS. 3 and 4 show examples of systems in which methods for dynamic network identification, to facilitate a selection of an audio data track, may be performed. In particular, the system of FIG. 3 includes several display devices, with each display device outputting video associated with a different content item, and a plurality of wireless networks, with each wireless network transmitting an audio data track associated with a different content item. While the system in FIG. 4 also includes the plurality of wireless networks transmitting the audio data tracks, the system of FIG. 4 includes a single display device outputting videos of the different content items. In both systems, users may listen to the audio associated with content items by causing their user devices to join wireless networks transmitting the audio data tracks associated with the content items. Furthermore, in both systems, users may identify the wireless networks transmitting the audio data tracks based on identifiers that may indicate the content item and/or associated audio. When a content item changes (e.g., based on the ending of the content item and the starting of a different content item), the identifier of the wireless network transmitting audio data associated with content items may also change to indicate the new content item and/or associated audio. Thus, identifiers of a wireless network may be "dynamic" because the identifiers may repeatedly change to indicate each new content item and/or associated audio.

One or more devices of these systems of FIGS. 3 and 4 may be located in or otherwise associated with a premises (e.g., the premises 102a) where multiple users may be located (e.g., a bar, a home (e.g., living room), a gymnasium, a hospital, a clinic, a physical therapy area, a dance club, an airport or other transportation center, a waiting area, etc.). Some of those devices, for example, may comprise one or more display devices (e.g., televisions) that may display various content items that users in the premises may view. A content item may comprise, for example, a presentation of a sporting event, a movie, a television program, and/or any other type of presentation of audio and/or video. A content item may be associated with audio data (that may be used to generate an output of audio for the content item) and/or video data (that may be used to generate an output of video for the content item). If a plurality of display devices are simultaneously presenting video for different content items, some or all of those display devices may have their output audio muted or have the volumes of their output audio turned low.

Figure 5:
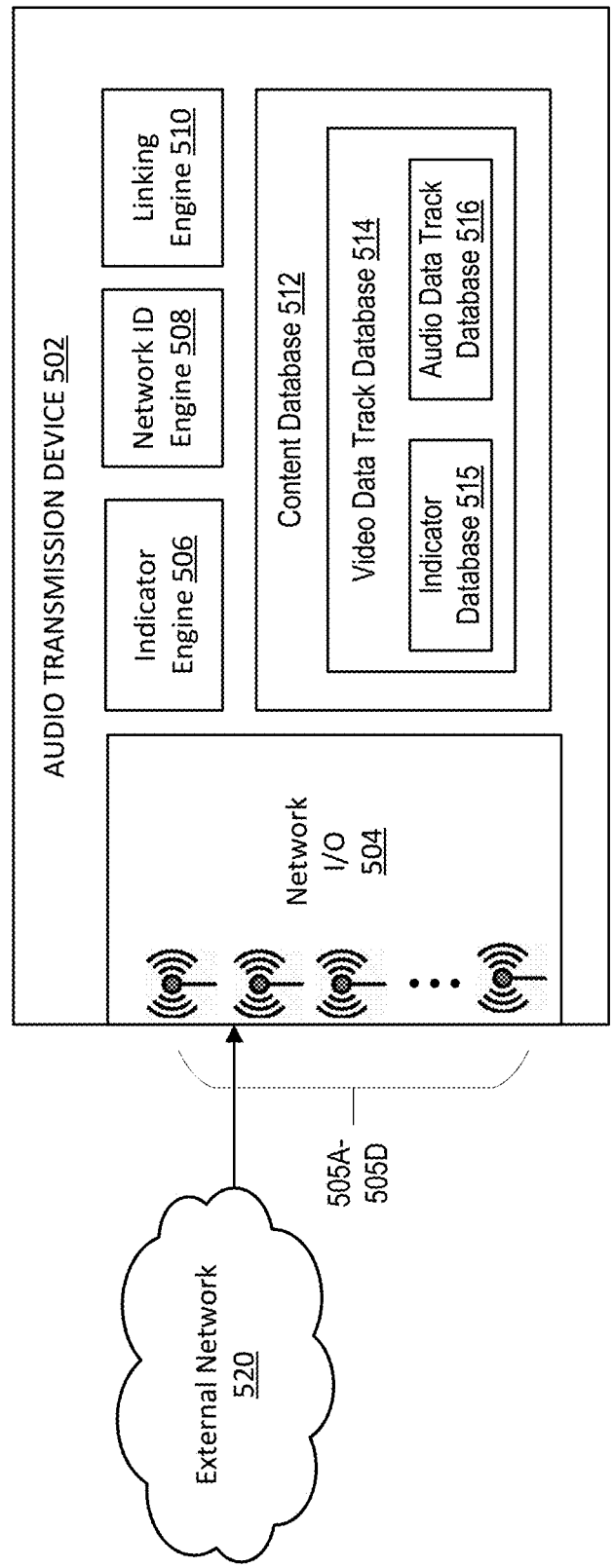
FIG. 5 shows an example audio transmission device that can be used to perform one or more functions described herein.

The example system shown in FIG. 3 may comprise a plurality of display devices (e.g., the display devices 306, 308, and 310) respectively outputting different content items (e.g., Content Item A, Content Item B, and Content Item C, respectively), a plurality of user devices (e.g., a user device 326 and a user device 330), and an audio transmission device 302. As will be described further below, FIG. 5 shows an example of the audio transmission device 302 in further detail. One or more users in a premises (e.g., a user 324 and a user 328) may carry or otherwise be associated with user devices (e.g., the user device 326 and the user device 330). As described herein, one or more of the users may cause a user device to join a wireless network to receive audio data for one or more of the content items being displayed by the display screens 306, 308, and 310. The user may identify the wireless network transmitting the desired audio data based on a network ID. For example, and as described below in connection with FIGS. 9A and 9B, user interfaces of user devices (e.g., the user devices 326 and 330) may display a list of network IDs. The network IDs may comprise text that indicates content items and/or audio associated with content items. The network ID associated with a wireless network may also change (e.g., be renamed) to a new network ID in order to reflect a change in the use of the wireless network. For example, when a presentation of one content item via a display device transitions into a presentation of another content item by the display device (e.g., from an ending of a first TV show to a starting of a second TV show), a wireless network channel that previously carried audio associated with the former content item may have had a network ID indicative of the former content item. After the transition, the wireless network channel may be reused to carry audio associated with the latter content item. A new network ID, which is indicative of the latter content item, may replace the previously used network ID for the wireless network channel. Thus, an assignment of the new network ID (e.g., the second wireless network identifier) to the wireless network channel may be based on, for example, a scheduled start of the presentation of the second video for the second content item, and/or a scheduled end of the presentation of the first video for the first content item.

Based on network IDs indicated to a user (e.g., via a user interface of a user device), a user may determine a wireless network carrying audio data for a content item of interest to the user, and the user may then cause the user device to join the determined wireless network. After joining a wireless network, the user(s) may listen to audio, generated from that received audio data, via the user device(s). For example, user 324 who may be interested in listening to Content Item C displayed in display device 310 may use her user device 326 to tune into the audio content corresponding to Content Item C. User 328, who may be interested in listening to Content Item B displayed in display device 308, may use his user device 330 to tune into the audio content corresponding to Content Item B. The user(s) may have the option to listen to the audio from the received data through an earphone and/or other sound producing elements (e.g., such as audio listening device 215) of their user device(s).

Furthermore, the example system may comprise an audio transmission device 302 (e.g., such as audio transmission device 117) to facilitate access to an audio data track desired by a user of the premises. For example, the audio transmission device 302 may determine and/or identify the content items being displayed via the various display devices 306, 308, and 310 of the premises. For each content item, the audio transmission device 302 may determine the one or more audio data tracks corresponding to the video data track of the content item. The audio transmission device 302 may determine the above information based on metadata associated with data tracks for content items, and/or via other communication with other devices (e.g., the gateway 111). The audio transmission device 302 and/or an external system (e.g., the dynamic network ID server 122) may dynamically generate network identifications (network IDs) for wireless networks to transmit each audio data track of each content item. For example, a network ID 318 may be generated for a wireless network transmitting an audio data track for Content Item A, a network ID 320 may be generated for a wireless network transmitting an audio data track for Content Item B, and a network ID 322 may be generated for a wireless network transmitting an audio data track for Content Item C. Thus, the system of FIG. 3 includes wireless networks that transmit audio data tracks associated with content items, with each audio data track having its own wireless network recognizable by its network ID. The network IDs 318-322 may assist the user in recognizing the audio data track or the content. For example, applications server 122 may manage a mobile application running on the user devices 326 and 330 of users 324 and 328, respectively. The mobile application may alert the user to audio data tracks of displayed content within a vicinity (e.g., within the system shown in FIG. 3). The audio data tracks may be identifiable by their respective network IDs. The network IDs may comprise all or part of the name of the content (e.g., Content Item C, Content Item B, etc.), an indicator of a language of the audio content, a program channel, a display device identification, or a combination thereof. When a first content item ends and a second content item begins, a first network ID, previously being used to identify a wireless network carrying audio data for the first content item may get replaced with a second network ID based on that wireless network being used to carry audio data for the second content item. The first network ID may comprise text that indicates or otherwise signifies the first content item and/or its associated audio, and the second network ID may comprise text that indicates or otherwise signifies the second content item or its associated audio. Thus, based on a wireless networks being used to transmit new audio data associated with a new content item, a previous network ID for the wireless network (and indicating a previous content item) may be replaced with a new network ID for the wireless network (and indicating the new content item).

Also or alternatively, the mobile applications running on user devices 326 and 330 may facilitate an augmented reality session via a user interface of each of the respective user devices 326 and 330. The augmented reality session may be initiated by a camera of the user device capturing or scanning a field of view that includes video output via one or more the various display devices 306, 308, and 310. The video output may be associated with a content item. The augmented reality session may include a display of the field of view augmented by the display of a network ID for a wireless network transmitting audio data associated with the content item, a user interface functionality providing the user with an option to join the wireless network, and/or an identifier of the content item associated with the video output.

FIG. 4 shows another example system, in which methods for dynamic network identification, to facilitate a selection of an audio data track, may be performed. In the example system shown in FIG. 4, a single display device (e.g., display device 406) may output multiple different content (e.g., Content Item A, Content Item B, Content Item C, and Content Item D) via multiple different video displays (e.g., video display 410, video display 412, video display 414, and video display 416, respectively). The single display device may be located within a home or other premises having a plurality of users (e.g., a user 424 and a user 428) who may carry or otherwise be associated with their respective user devices (e.g., a user device 426 and a user device 430, respectively). As may be typical for some premises, such as a home, various users may congregate around a display device (e.g., a display device 406) in a setting such as a living room, but each user may be interested in a different content item playing via the display device. As shown in FIG. 4, the display device 406 may have its display area partitioned to show the various content items on various video displays (e.g., areas where a video output associated with a content item may be visible). In order to allow each user to enjoy the experience of viewing a desired content item without being disturbed by the audio of a content item that another user is enjoying, the display device may have its output audio muted or have its audio volume turned low. As described herein, one or more of the users may cause a user device to join a wireless network to receive audio data corresponding to one or more of the content items being displayed via the display device 406. For example, the user 424, who may be interested in listening to audio associated with Content Item A (for which the video output is shown on video display 410) may cause his user device 426 to join a wireless network to receive audio content corresponding to Content Item A. User 428, who may be interested in listening to audio associated with Content Item D (for which video output is shown on video display 416), may cause her user device 430 to join a wireless network to receive audio content corresponding to Content Item D.

As previously discussed, a network ID may assist a user to identify the wireless network transmitting the audio data for a desired audio. The network ID may indicate (e.g., by naming one or more characteristics of) the desired audio and/or the content item associated with the desired audio. The network ID may also change (e.g., be renamed) to a new network ID based on a change from one content item and/or its associated audio to another content item and/or its associated audio. A network ID may, for example, be assigned as a service set identifier (SSID), as an indicator of an independent basic service set (IBSS), as a wireless local area network name, as a wireless personal area network name, and/or as another type of logical and/or physical channel name.

As shown in the example system of FIG. 4, the display device 406 may also facilitate access to audio data tracks desired by the users of the premises. For example, after identifying the various content that it is displaying (e.g., Content Item A, Content Item B, Content Item C, and Content Item D), the display device 406 may identify the one or more audio data tracks corresponding to the video data track of each content. The display device 406 may receive, determine, and/or identify the above information via communication with other devices (e.g., the gateway 111). The display device 406 and/or an external system (e.g., the dynamic network ID server 122) may dynamically generate network IDs for the wireless networks transmitting each audio data track of each content item. Thus, a network ID 432 may be generated for a wireless network transmitting an audio data track for Content Item A, a network ID 434 may be generated for a wireless network transmitting an audio data track for Content Item B, a network ID 436 may be generated for a wireless network transmitting an audio data track for Content Item C, and a network ID 438 may be generated for a wireless network transmitting an audio data track for Content Item D. The network IDs may assist users (e.g., the users 424 and 428) in recognizing the audio data track and/or the content item on their respective user devices (e.g., user devices 426 and 430, respectively). For example, applications server 122 may manage a mobile application running on the user devices 426 and 430. The mobile application may alert the users to audio data tracks of displayed content within a vicinity (e.g., within proximity to one or more devices of the system shown in FIG. 4). The audio data tracks may be identifiable by their network IDs. The network IDs may comprise all or part of the name of the content (e.g., Content Item A, Content Item D, etc.), an indicator of a language of the audio content, a program channel, a display device identification, or a combination thereof. A network ID of a wireless network may thus change according to the audio data being transmitted by the wireless network. For example, if a first content item ends and a second content item begins, and if a wireless network transmitting audio data for the first content item subsequently transmits audio data for the second content item, the network ID for the wireless network may change (e.g., be renamed) to refer to the second content item and/or its associated audio.

In systems where there are multiple display devices, a display device (e.g., the display device 406) may assume the role of a main display device to control various functions of other devices (e.g., secondary display devices) (not shown in FIG. 4). For example, the display device 406 located in the living room of an example premises may control the display of content in a television screen located in a bedroom of the premises. By assuming the role as a main display device, display device 406 may perform handshaking operations with the respective secondary display devices, which may receive and may send acknowledgement operations back to the main display device, as may be known to those having ordinary skill in the art. The main display device may perform the function of facilitating access to the audio data tracks of various content, as described herein. Also or alternatively, multiple display devices in a system may operate without any device acting as a main display device or as a secondary display device.

FIG. 5 shows an example audio transmission device 502 that may perform one or more operations described herein. The operations include facilitating the transmission of audio data tracks associated with content items over wireless networks, e.g., so that a user of a premises may be able to listen to audio for a desired content item by causing his or her user device to join a wireless network to receive an audio data track associated with the desired content item. The audio transmission device 502, as shown in FIG. 5 and described herein, may be an example of the audio transmission device 302 shown in FIG. 3 and audio transmission device 117 shown in FIG. 1. The audio transmission device 502 may comprise a system, device, server, and/or application that communicates with external systems via an external network to identify or determine various content items being displayed on display devices within a premises, and facilitate access to the audio data corresponding to the various content items. The external systems may include, for example, the servers 105-107 and 122 from which the audio transmission device may obtain information related to the various content items as well as information pertaining to network identifications. Also or alternatively, the audio transmission device, as shown in FIG. 5, may be a computing device (e.g., as in computing device 200) that also performs operations described in connection with other devices described herein (e.g., computing device may perform operations of an audio data transmission device and operations of one or more display devices).

A network I/O 504 may be a wired interface (e.g., electrical, RF (via coax), optical (via fiber)), a wireless interface, or a combination of the two. The network I/O interface 504 may comprise a modem configured to communicate via the external network 520. The external network 520 may comprise the communication links 101 or the external network 109 discussed in FIG. 1, the external network described in FIGS. 2-4, an in-home network, a network provider's wireless, coaxial, fiber, or hybrid fiber/coaxial distribution system (e.g., a DOCSIS network), or any other desired network. The network I/O 504 may assist in transmitting network identifications (IDs) 505A-505D for various audio data tracks. For example, devices within the premises may receive an indication of an availability of a network having one of the network IDs 505A-505D. A user of the premises may cause his or her user device to join a wireless network to receive an audio data track. The wireless network may be one of a plurality of wireless networks identifiable by its network ID (e.g., one of the IDs 505A-505D).

The network IDs may be generated by the network ID engine 508. The network IDs may identify audio data delivered by wireless networks (e.g., Bluetooth, Wi-Fi, 5G, etc.). For example, the network IDs may be assigned as service set identifiers (SSIDs), as names or indicators of independent basic service sets (IBSSs), as names of wireless local area networks, as names of wireless personal area networks, and/or as names for other logical and/or physical channels. The wireless local area network may comprise, for example, a WiFi or other 802.11 network. The wireless personal area network may comprise, for example, a BLUETOOTH or a ZIGBEE network. The wireless network may be identifiable to a user device. A network ID (e.g., assigned as an SSID, a Bluetooth ID, etc.) may be a natural language description identifiable to a user. For example, the network ID may include all or part of a name of a content item, a language of an audio content, a program channel, a display device identification, or a combination thereof. Although the underlying wireless network that is identifiable to a user device may be reused to transmit different audio data, the network IDs identifying the audio data transmitted by the wireless network may change depending on the audio data. For example, if one content item (e.g., a first TV show) being output via a display device ends and a new content item (e.g., a second TV show) begins, the audio data being delivered by the wireless network may change to that of the new content item. Although the wireless network may be reused to carry audio data associated with a new content item, the network ID may change to reflect the new content item. A user of the user device may recognize the network ID as being indicative of the new content item and/or its associated audio.

Also or alternatively, a user device may obtain a network ID for an audio data track by obtaining an indicator (e.g., data indicating or revealing the network ID) from video for a content item that is being displayed on a display device. The indicator engine 506 may be a system, application, and/or plug-in that generates, identifies, and/or stores the indicator for various content items. The indicator may be visible (e.g., a Quick Response (QR) code, a barcode, etc.), imperceptible, (e.g., a digital watermark), or a combination thereof. Also or alternatively, the indicator may comprise metadata received as part of the video data associated with the content item. For example, a user may be prompted (via an instruction sent to the user device) to scan or capture an image of a content item that is being displayed on a display device, for which the user desires to receive audio data. The scanned or captured image of the content item may reveal a visible or an imperceptible data that can be used to access a wireless network, unlock or authorize access to a wireless network, or provide a network ID for a wireless network. For example, an image captured by the user device may reveal an ordinary screenshot of a video output associated with a content item (e.g., a screenshot of a TV show). However, upon digitally processing the image, the user device may obtain a covertly hidden digital watermark. The digital watermark may indicate the network ID of the wireless network through which an audio data track associated with the content item is being transmitted. Thus, the indicator (e.g., the Quick Response (QR) code, the barcode, digital watermark, and/or the metadata, etc.) can be used to provide the user with the network ID for the desired audio data track. An application on the user device, after processing the captured image and extracting the indicator (e.g., via an image recognition of a visible indicator and/or via an image processing to uncover an imperceptible indicator), may identify or determine a network ID based on the indicator. The mobile application may prompt the user to join a wireless network identified by the network ID. Also or alternatively, based on the captured or scanned image that includes the indicator, the user may be automatically prompted to select from a plurality of audio available for the content item (e.g., via a user interface). A selection of one of the plurality of audio, by the user, may cause the user device to automatically connect to a wireless network that provides an audio data track that generates the selected audio.

The indicator engine 506 may store or generate such indicators to overlay, accompany, or embed with the video for the content items being displayed on display devices. Also or alternatively, indicators for content items may be generated externally (e.g., by the content creators). The audio transmission device 502, via its indicator engine 506, may identify a content item by its indicator, and use the indicator to determine the corresponding audio data of the content item.

The audio transmission device 502 may also or alternatively store various data in databases or other storage media in order to facilitate access to audio data for content items. For example, a content database 512 may store data pertaining to various content items that are being displayed on display devices within a specified vicinity. The specified vicinity may be a radial (or other) distance around the audio transmission device 502 and/or a premises (e.g., a public bar, a home, a gymnasium, a hospital, a clinic, a physical therapy area, a dance club, an airport or other transportation center, a waiting area, etc.) that the audio transmission device 502 is intended for. The stored data may comprise video data of the various content items, audio data corresponding to the video data of the various content items, and attributes associated with the content item. The attributes may comprise, for example, a title of a content item, descriptive information of the content item, a genre of the content item, a service associated with providing or transmitting the content item (e.g., a broadcast, a cable associated with a particular content provider, an Internet Protocol Television (IPTV), a streaming service, any other types of channels, etc.), an application transmitting the content item, content advisory data for the content item, and/or languages of one or more audio data tracks associated with the content item. The attributes may also or alternatively comprise any indicators included in the video data of the content item, e.g., to facilitate the access of network IDs for users to tune into the audio data for the content item.

The video data track database 514 may store or track the video data files (e.g., video data tracks and information associated with the video data tracks) for the respective content items. The video database 514 may be used, for example, to remedy issues related to timing discrepancy between an audio data track and a video data track when a user is listening to the audio generated based on the audio data track of a content item on his or her user device while viewing the video generated based on the video data track of the content item. For example, the video database 514 may associate segments of a video data to segments of an audio data based on similarities in sequence and/or timing. Thus, if a user device experiences delay for a duration of time in receiving audio data via a wireless network, the audio transmission device 502 may remedy the delay by providing a segment of audio data corresponding to the video being output by a display device during the duration of time. The segment of audio data for the duration may be identified based on its association with a segment of stored video data that corresponds with the video being output by the display device during the duration of time. The segment of audio data may be transmitted to the user device by the audio transmission device 502 via a wired or wireless network that has better connectivity than the wireless network through which the user device was previously receiving the audio data track. One or more operations for remedying issues related to the timing discrepancy will be described in more detail, in conjunction with FIG. 6. The video database 514 may store or track, e.g., within an indicator database 515, the indicators or other metadata used in the video data of a content item to indicate the corresponding audio data and other attributes for the content item.

The content database 512 may also or alternatively include an audio database 516 to store or track the audio data files corresponding to the video data file of each content item. For example, if a content item is an episode from the HBO show GAME OF THRONES, video data for the content item may comprise data for a sequence of frames and/or images corresponding to the episode of GAME OF THRONES. The corresponding audio data may be used to generate the audio (e.g., sound recording) of the episode in various languages. The video data need not include sound data. The audio database 516 may also be used to remedy issues related to timing discrepancy between audio data tracks and video data tracks when a user is listening to the audio data track on his or her user device while viewing the video data track of a content item displayed on a display device. One or more operations for remedying issues related to the timing discrepancy will be described in more detail, in conjunction with FIG. 6.

The audio transmission device 502 may comprise a linking engine 510. The linking engine 510 may comprise a system, device, hardware, and/or control logic that updates, receives, and/or associates various information stored or generated in the audio transmission device (e.g., network IDs, indicators, content items, video data, audio data, etc.). For example, the linking engine 510 may link one or more audio data to a video data, link the video data to a content item, and link attributes of the content item to an indicator. Furthermore, the linking engine 510 may comprise an update interface for creating, replacing, updating, or deleting various data (e.g., content items, video data, indicators, audio data, network IDs).

The various systems and/or components described above as part of, and/or the operations described above as performable by, the audio transmission device 502, may also or alternatively be comprised by, facilitated by, and/or performed by another computing device (e.g., a main display device 113, a gateway 111, a dynamic network ID server 122, etc.).

Figure 6:
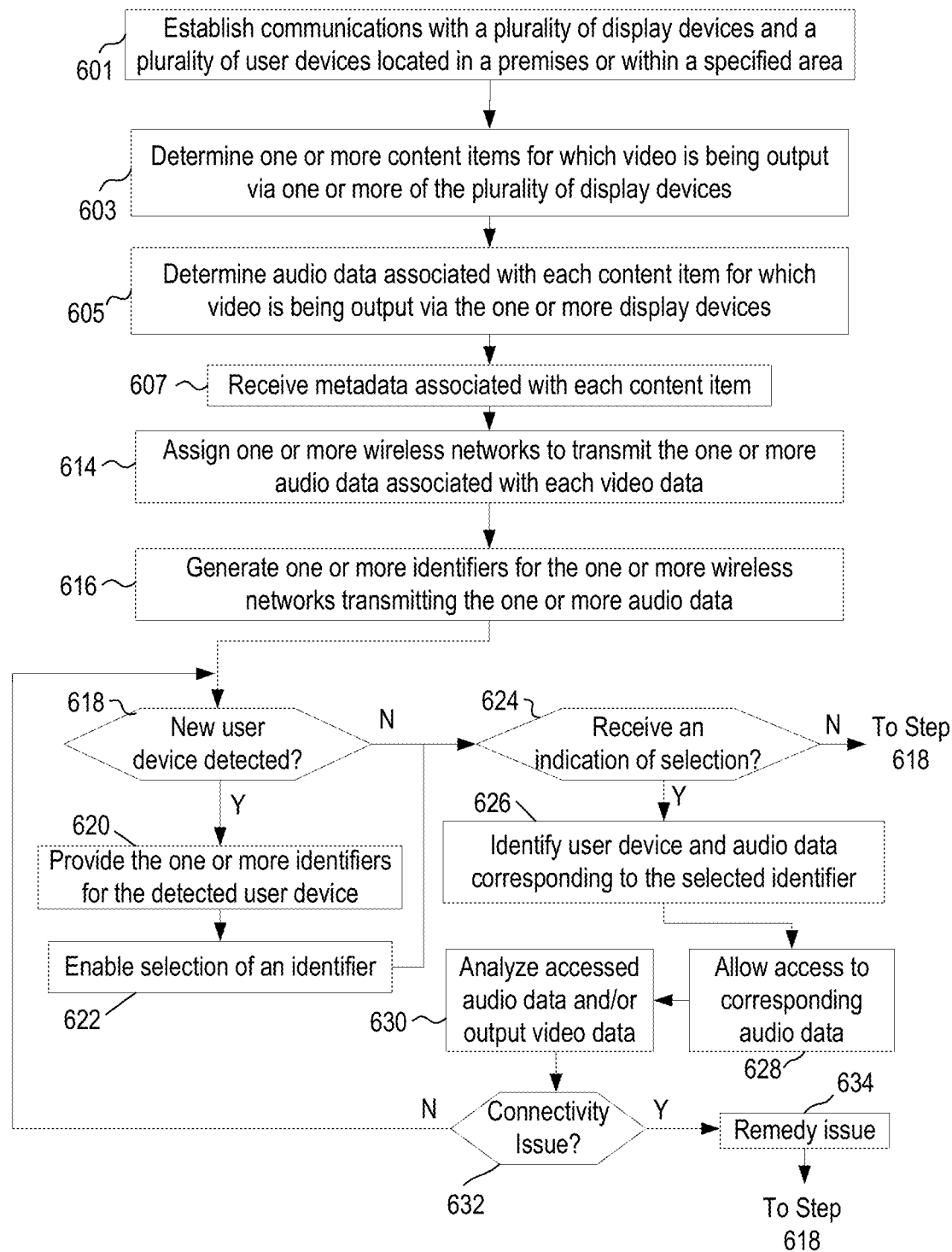
FIG. 6 is a flow chart showing an example method for dynamic network identification to facilitate a selection of audio data.

FIG. 6 is a flow chart showing an example method 600 for dynamic network identification to facilitate a selection of audio data. One or more steps of the method 600 may be performed by one or more computing devices 200. As previously explained, a computing device 200 may comprise one or more of the audio data transmission device 502, the main display device 113, the gateway 111, a remote server (e.g., the dynamic network ID server 122, the application server 107), and/or another computing device. For convenience, the method 600 is described below as performed by "the computing device 200." However, one, some, or all of the steps of the method 600 may be performed by different computing devices and/or by combinations of computing devices. For example, some steps of method 600 may be performed by the main display device 113 and other steps of method 600 may be performed by the audio transmission device 502, the gateway 111 and/or a remote server, but the performers of the steps of method 600 may collectively be described as being performed by a "computing device 200," for convenience. Although additional examples are provided in connection with performance of steps by certain types of computing devices, none of those steps are limited to performance by those types of computing devices. One or more steps of the method 600 may be rearranged, omitted, and/or otherwise modified, and/or other steps added.

As discussed previously, the premises 102*a* may have one or more display devices (e.g., television screens) outputting video of various content items (e.g., television programs) in mute or reduced volume. Thus, method 600 may begin by establishing communications with one or more display devices and one or more user devices located within the premises (e.g., as in step 601). If the computing device 200 is located within the premises having the display devices (e.g., where the computing device 200 is a gateway 111, a main display device 113, or an audio transmission device 117 located in the premises 102*a*), the computing device 200 may detect display devices and user devices within a specified vicinity from the computing device 200. For example, the computing device 200 may detect one or more display devices and/or user devices within the specified vicinity by using the GPS 211 located in the display devices and user devices. The GPS 211 may be used to track the location of the display devices and user devices as being within the specified vicinity (e.g., as in step 601). The specified vicinity may be a radial distance based on a given radius from the computing device 200 or based on a given radius from a predetermined location within the premises. Also or alternatively, the display devices and user devices may be detected by the computing device 200 via a scan of a specified vicinity for discoverable devices.

If the computing device 200 is located remotely from the premises (e.g., where the computing device 200 is a remote server (e.g., dynamic network ID server 122)), the computing device 200 may detect the plurality of display devices and the plurality of user devices located in the premises by using another device (e.g., gateway 111, audio transmission device 117, etc.) located within the premises to perform the detection. Also or alternatively, communications with the plurality of display devices and/or user devices may be manually established for example, by inputting information about the plurality of display devices and/or user devices for the computing device 200 to detect and identify the plurality of display devices and/or user devices. For example, an operator of the computing device 200 may enter information (e.g., via input device 208) that assists the computing device 200 in identifying and/or locating the plurality of display devices and/or user devices.

The one or more display devices within the premises may output one or more content items on their respective visual displays. Optionally, one of the one or more display devices (e.g., the main display device 113) may control the output of content items on the other display devices (e.g., the secondary display devices 114A-114B). A display device may become a main display device if the display device has the highest signal strength among the display devices. The signal strength may be based on the strength of connectivity between a display device and another device (e.g., gateway 111, audio transmission device 117, etc.). Also or alternatively, a display device may be designated or selected as a main display device arbitrarily (e.g., a randomized selection) or based on a specific hierarchical ranking (e.g., the highest MAC address). A main display device may receive and/or relay data for one or more content items (e.g., via the gateway 111 or a remote device) and may cause the output of content items via the secondary display devices. A main display device may comprise components and/or may perform functionalities that have been described as being associated with other devices described herein (e.g., audio transmissions device 117, gateway 111, etc.). Thus, the main display device may be an example of a computing device 200 that performs one or more steps of method 600.

The computing device 200 may identify or determine the content items for which video will be output via the one or more display devices (e.g., as in step 603). For example, the computing device 200 (e.g., the audio transmission device 117) may communicate with the gateway 111 and/or one or more display devices located in the premises to determine what content items are being output via the one or more display devices located in the premises. If the computing device 200 comprises the main display device, the computing device 200 may determine the content items that will be output via the one or more secondary display devices.

Each content item may comprise video data tracks for video being output, and one or more audio data tracks. The computing device 200 may determine the one or more audio data associated with each of the content items for which video is being output via the plurality of display devices (e.g., as in step 605). For example, the computing device 200 may obtain access to, or control of, the audio data corresponding to the content items being output via the one or more display devices located in the premises.

At step 607, the computing device 200 may also receive metadata associated with each content item. For example, the computing device 200 may receive program guide data associated with the content item, a content listing associated with the content item, program identifier data in a transport track associated with the content item, closed captioning data, data identifying a service associated with the content item; temporal data associated with the content item etc.

The metadata may be obtained from one or more devices of the premises 102a. For example, the computing device 200 may communicate with the gateway 111 and/or one or more display devices located in the premises 102a to determine or extract any metadata associated with the content items being output via the one or more display devices located in the premises. If the computing device 200 comprises the main display device, the computing device 200 may determine or extract metadata associated with the content items that will be output via the one or more secondary display devices. The determined or extracted metadata may include, for example, a title of a content item, a service carrying the content item, a temporal data associated with the content item, an indicator of available audio tracks for the content item, and information about a specific audio track for the content item (e.g., a language of the audio). Also or alternatively, the computing device 200 may obtain the metadata from outside the premises 102a. For example, one of the servers of local office 103 (e.g., push server 105, content server 106, app server 107, dynamic network ID server 122) may send metadata to the computing device 200, e.g., based on a request for metadata associated with a content item. Also or alternatively metadata for a content item may be transmitted with video data and/or audio data associated with the content item. As will be discussed further, the computing device 200 may use the determined or extracted metadata of each content item to generate network IDs for wireless network channels that will carry audio data for the content item.

At step 614, the computing device 200 may determine or assign one or more wireless networks to transmit the one or more audio data tracks associated with each video data and/or content item. The one or more wireless networks may be one of multiple separate frequency, time, code, and/or other multiplexed channels transmitted by a single access point. If the computing device 200 is an audio transmission device 502 as shown in FIG. 5, the one or more audio data tracks may be assigned to the one or more wireless network channels by the network ID engine 502. The one or more audio data tracks may be transmitted via the one or more wireless networks using network I/O 504. For example, the computing device 200 may cause the transmission of the one or more audio tracks corresponding to one or more content items, while video for the one or more content items is being output via the one or more display devices (e.g., during simultaneous presentation of the video of the one or more content items). If the computing device 200 comprises a main display device, the one or more audio data tracks may be sent to the audio transmission device 502 or another device (e.g., gateway 111, dynamic network ID server 122) to be assigned to the wireless networks. Also or alternatively, the main display device may comprise hardware and/or subsystems (e.g., the network ID engine 508, the network I/O 506, etc.) for assigning audio data to the wireless networks. The wireless networks may span a personal area (e.g., ZIGBEE, BLUETOOTH, etc.), a local area (e.g., Wi-Fi), a wide area, a cellular area (e.g., 5G), or a global area.

The computing device 200 may generate a network ID for each of the one or more wireless network channels transmitting the audio data tracks (e.g., as in step 616). The generated network IDs may assist users in identifying audio associated with the audio data tracks in order to allow the users to select a desired audio. The computing device 200 may facilitate or cause the transmission of audio data for a content item, via a wireless network assigned to transmit the audio data. The transmission may occur while the wireless network identifier is assigned to the wireless network. Furthermore, the transmission may occur during presentation of video, via a display device based on video data associated with the content item.

Furthermore, the computing device 200 may cause the transmission of the network ID (e.g., a wireless network identifier) assigned to the wireless network transmitting audio data associated with the content item. For example, the network ID may be transmitted (e.g., via its corresponding wireless network, an associated out-of-band data transmission for the corresponding wireless network, or a separate communication method) to known or detected user devices within premises 102a to indicate the available wireless network. Thus, transmitting the network ID may involve presenting (e.g., broadcasting), to the user device, the name of an SSID, a name or an indicator of an IBSS, a name of a wireless local area network, a name of a wireless personal area network, and/or a name for of any other logical and/or physical channel, etc. The transmission of the network ID may occur during the presentation of the video associated with the content item and/or during the transmission of the audio data via the wireless network. As will be described herein, the generated network IDs may be revealed to the users on their user device as the user device searches for available wireless networks within the premises.

Furthermore, the computing device 200 may use the metadata received in step 607 for each content item to generate the network IDs for wireless network channels transmitting audio data associated with the respective content item. In at least one example for generating a network ID from metadata of a content item, the computing device 200 may extract text from one or more known fields of metadata (e.g., a field for a title and/or a service name associated with the content item). The extracted text may be truncated for brevity (e.g., by deleting "The" or other words from the beginning of the title or the service name). Furthermore, the extracted text may be appended or combined with other extracted text from various other fields of the metadata to form the network ID. For example, as will be discussed in connection to FIGS. 9A and 9B, the computing device 200 may append extracted text from various known fields of metadata. As shown through the first network ID in markers 912A and 912B, "ESPN" can be extracted from a field of metadata for the name of a service carrying the content item, and "NFL: GB CHI" can be extracted from a field of metadata for a content listing. A content item may have multiple audio tracks. The network ID for the wireless network channel carrying an audio track may identify a specific audio track of the multiple audio tracks, e.g., by extracting and appending text from known fields of metadata for information about an audio. For example, as shown through the first network ID in markers 912A and 912B in FIGS. 9A and 9B, respectively, "Eng" can be extracted from a field of metadata for information about an audio (e.g., language of the audio). The extracted texts may be appended together to form the network ID "ESPN—NFL: GB CHI—Eng."

In another example for generating a network ID from metadata of a content item, the computing device 200 may receive, e.g., at step 607, a special purpose metadata associated with a content item. The special purpose metadata may be specifically created, generated, and/or sent with the content items for the generation of the network ID. For example, the special purpose metadata may comprise a pre-generated network IDs, or an encrypted code that the computing device 200 may decrypt to form a network ID.

Also or alternatively, there may be pre-specified rules for the naming of network IDs based on certain types of content items. As an example, a rule for the naming a network ID for a wireless network channel carrying audio data for a sports game could be: insert the name of the service carrying the content item as the first part of the network ID (e.g., "ESPN"); insert the sport name or abbreviation, followed by a colon, as the second part of the network ID (e.g., "NFL:"); insert the abbreviated name for the team or team cities as the third part of the network ID ("GB CHI"); and insert an indicator of the language of an audio associated with the content item as the fourth part of the network ID (e.g., "Eng").

Also or alternatively, the user may obtain the identifier for an audio data track for a desired audio of a content item after scanning and/or capturing an indicator (e.g., QR code, digital watermark, barcode, metadata, etc.) displayed on, or accessible from, a display device. For example, as will be described in relation to FIG. 8, as the camera of the user device scans a field of view that includes a display device, the user interface of the user device may display an augmented reality of the field of view. The augmented reality may comprise, in addition to the field of view, information about the content item for which video is being output via the display device, and a user interface functionality that provides the user with the option to join a wireless network to access audio associated with the content item. The user interface functionality and one or more subsequent options for receiving audio associated with the content item may be identifiable or recognizable to the user via the network ID. The user interface functionality may overlay the field of view. Furthermore, the user interface functionality may be displayed as text (e.g., "Connect to receive audio") and/or by illustration (e.g., an audio speaker icon). Also or alternatively, the user interface functionality need not indicate a network ID, but may rather invite the user to join a wireless network transmitting the audio data track associated with the content item.

Thus, computing device 200, whether it is the main display device 113, audio transmission device 117, gateway 111, another device, or a combination thereof, may manage or obtain information regarding the output of content items on various display devices (e.g., secondary display devices 114A-114B), and may generate network IDs for wireless networks transmitting audio data for the output content items.

The plurality of display devices may be situated in a premises (e.g., a bar, a home, a gymnasium, a hospital, a clinic, a physical therapy area, a dance club, an airport or other transportation center, a waiting area, etc.) that may be attended by one or more users with their respective user devices 125. As discussed previously in step 601, the computing device 200 may detect the user devices of the users within a specified vicinity, e.g., as users enter the premises. Users of the detected user devices may be able to view the generated network ID (e.g., SSID) of each of the one or more wireless networks for the one or more audio data tracks. If the computing device 200 detects the presence of a new user device in the specified vicinity (e.g., as in step 618), the generated network ID for each of the one or more wireless network channels may thus be provided to the detected user device (e.g., as in step 620). For example, the computing device 200 may cause the output of data indicating an association of the wireless network with the audio data track and/or the content item associated with the audio data track. A user device may be a new user device detected by the computing device 200 if the user device has not yet received the generated network IDs.

The user may be prompted to select a network ID from the generated network IDs in order to tune to an audio data track associated with a desired audio. For example, upon entering a premises, the user device may receive a notification that the user has the option to listen to any audio associated with any one of a plurality of television programs displayed on a plurality of display devices in the premises. The notification may further instruct the user to select from a list of wireless networks with network IDs that help the user map each wireless network to an audio of a television program. Also or alternatively, the notification may instruct the user to scan or capture an image of a video output of the desired content item for which the user would like to receive audio content. The user may take his or her user device and scan or capture an image of a video output via one of the plurality of display devices that outputs the user's desired content item. The user device may process the scanned or captured image to detect an indicator (e.g., a QR code, bar code, digital watermark, metadata, etc.). The indicator may be part of or may be embedded or overlaid with the video image data of the content item. The indicator may lead the user to the correct network ID and/or wireless network for receiving a desired audio content for the desired content item. The indicator may comprise data indicating an association of a wireless network and/or its network ID with an audio data track or a content item associated with the audio data track. A computing device 200 (e.g., audio transmission device 117, gateway 111, etc.) may cause the output of the indicator during output of video via a display device.

Also or alternatively, the user need not know the actual network ID of the wireless network transmitting audio data of a desired audio. For example, a mobile application may prompt the user to confirm whether it would like to receive a desired audio. Based on the confirmation, the mobile application may cause the user device to connect to a wireless network to receive audio data for the desired audio, without revealing information about the wireless network (e.g., network ID) to the user. Thus, there may not be a need to generate new network IDs each time a new content item is being shown on the one or more display devices.

A computing device 200 may fail to detect any new user devices within the premises or specified vicinity. for example, if there are no new user devices within the premises, or if all user devices within the premises or specified vicinity have already received identifiers for one or more wireless networks transmitting tracks of audio data. The computing device 200 may determine whether it has received an indication that a user has selected a network ID (e.g., as in step 624). As previously discussed, a user may select an identifier on his or her user device in order to tune into an audio data track transmitted by the wireless network corresponding to the assigned identifier. The indication may be received directly from the user device of the user. If a user has selected an identifier, the computing device 200 may identify the user device and audio data track corresponding to the selected identifier (e.g., as in step 626). Based on this identification, the user device may be allowed to access the corresponding audio data track (e.g., as in step 628). For example, the user may select (e.g., on a touchscreen interface of the user device) a wireless network having an identifier that indicates that the wireless network is for a desired audio data track for a content item that the user is watching. Upon approval by the computing device 200 of the user's selection, the user device may begin playing the audio generated from the desired audio data track of the content item that the user was watching. For example, a mobile application on the user device may process the received audio data and output sound via an output device interface (e.g., an audio jack, a Bluetooth device, speaker, etc.) of the user device.

Multiple wireless networks in a premises may be available to a user via his or her user device. The premises may have one or more display devices showing one or more content items in mute or reduced volume. Each of the one or more content items may have different audio data tracks. Over each wireless network, the computing device 200 may transmit (or cause another device to transmit) a different audio data track. The user that desires to listen to an audio of a desired content item may cause his or her user device to join a wireless network having the audio data track that would generate the desired audio. Once joined to that network, the user device may be able to receive the audio data track via that joined wireless network.

At step 630, the computing device 200 may assess the audio data track being accessed by a user device, or a video being output via a display device, to determine whether there are any connectivity issues. Potentially, an audio data track may be insufficiently synchronized with the video data track of a content item. Also or alternatively, the device receiving a video data track and/or an audio data track associated with the content item (e.g., the set top box/DVR 112, the main display device 113, or the audio transmissions device 117) may have a connectivity issue caused by weak signal strength. The connectivity issue may cause a delay in the output of video associated with the content item, and/or a delay in the transmission of the corresponding audio data track to the user device via the wireless network. For example, the transmission of an audio data track associated with a content item to the user device may be delayed and/or interrupted due to a connectivity issue with the device receiving audio and video data associated with the content item. However, other devices in the premises (e.g., the secondary display devices 114A-114B) may be receiving video data tracks associated with the content item and may not have the connectivity issue. At step 632, the computing device 200 may determine whether there is a connectivity issue (e.g., in the delivery of the audio data to the user device, the output of video via the display device, or the receiving of audio or video data associated with the content item). If there is a connectivity issue, the computing device 200 may seek to remedy the connectivity issue (e.g., 634). For example, the computing device 200 may buffer the audio data track or the video data track so that both data tracks are synchronized. Also or alternatively, where the computing device 200 is the main display device 113, remedying the connectivity issue may involve designating another display device (second display device) as the main display device 113 (and thereby replacing the previously designated main display device). The second display device may have a signal strength that is better than the display device that was previously designated as the main display device 113, and may be able to resolve the timing discrepancy in the delivery of audio data. The second display device, based on its designation as the main display device 113, may perform one or more steps of method 600 described above. If there is no connectivity issue, the computing device 200 may repeat one or more steps of method 600 (e.g., one or more of steps 618 to 634).

Figure 7:
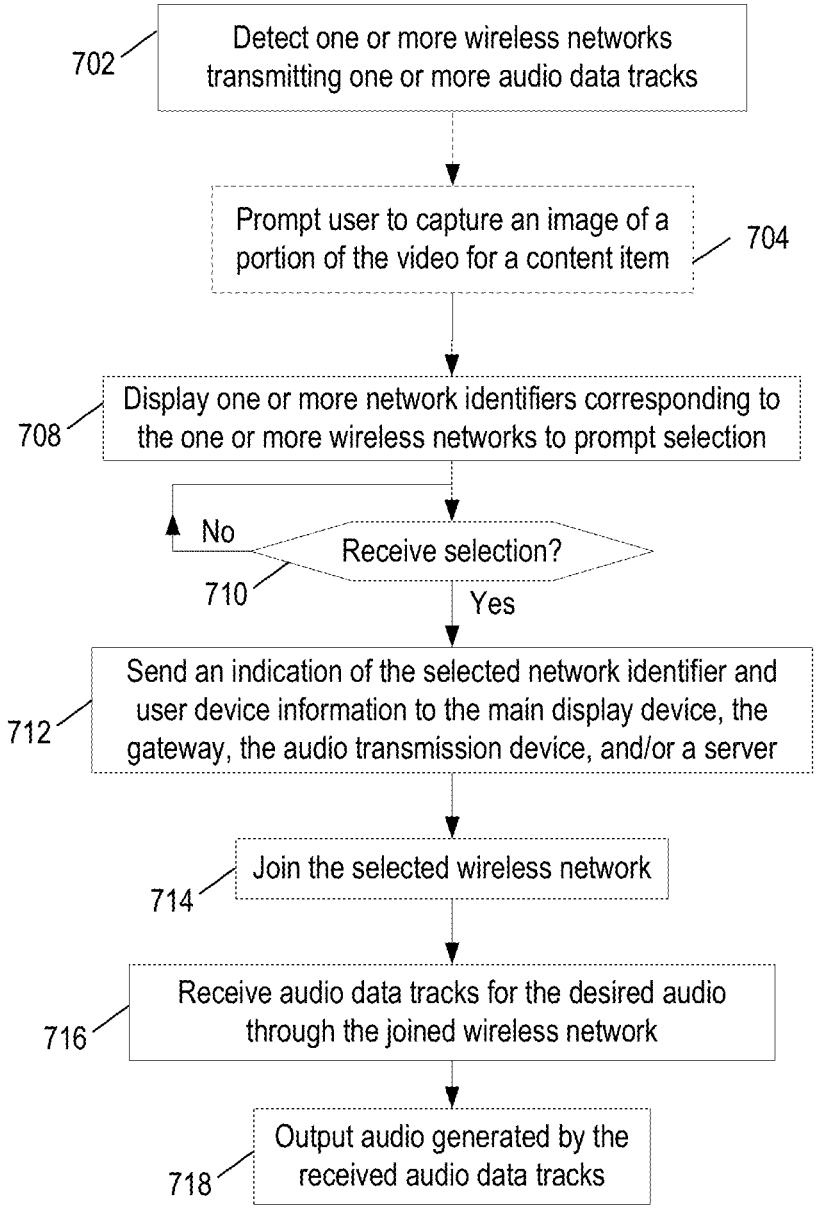
FIG. 7 is a flow chart showing an example method for the selection and access of audio data using dynamic network identification.

FIG. 7 is a flow chart showing an example method 700 for the selection and access of audio data using dynamic network identification. Method 700 may be performed by the user device 125 associated with a user in the premises 120a. Functionalities existing within the user device 125 may allow the selection and joining of a wireless network as indicated in the steps below. Also or alternatively, an application executing on the user device 125 may perform one or more of the steps below. The application may be managed, hosted, or otherwise controlled remotely, e.g., by the application server 107. Thus, one or more steps of method 700 may be performed by user device 125 (e.g., via a mobile application) and/or indirectly by the application(s) server 107 controlling the mobile application on the user device 125. For convenience, the method 700 is described below as performed by "the user device 125." However, one, some, or all of the steps of the method 700 may be performed by different computing devices and/or by combinations of computing devices. Although additional examples are provided in connection with performance of steps by certain types of computing devices, none of those steps are limited to performance by those types of computing devices. One or more steps of the method 700 may be rearranged, omitted, and/or otherwise modified, and/or other steps added.

As previously discussed, a premises 120a may have a plurality of display devices outputting video for a plurality of content items. Each content item, whose video is being output by a display device, may comprise or otherwise be associated with one or more audio data tracks. As discussed in relation to method 600, one or more wireless networks may be assigned to transmit the one or more audio data tracks.

A user device 125 located in (or entering) the premises 120a may detect the one or more wireless networks transmitting the one or more audio data tracks (e.g., as in step 702). For example, a user that enters the premises may notice that his or her user device indicates that one or more new wireless networks are available. The user device 125, via its existing functionalities (e.g., an application and/or an operating system that displays a list of available wireless networks that can be joined) and/or via the application, may display one or more network identifiers for the one or more wireless networks transmitting the one or more audio data tracks (e.g., as in step 708). The applications server 117 hosting, managing, or otherwise controlling the application on the user device 125 may be communicatively coupled or linked with the computing device 200 performing the one or more steps of method 600. As discussed previously in relation to steps 614 of method 600, the computing device 200 may have assigned the one or more wireless networks to transmit the one or more audio data tracks associated with content items, whose videos are being output via the display devices.

Thus, the user may access, via functionalities of the user device, a list of available wireless networks that can be joined. The user could be informed of the availability of such choice of wireless networks for different audio tracks, for example, by a sign in the premises. The user may recognize that a wireless network carries a desired audio track via a network identifier associated with the wireless network and identifying the desired audio track and/or its associated content item.

Figure 8:
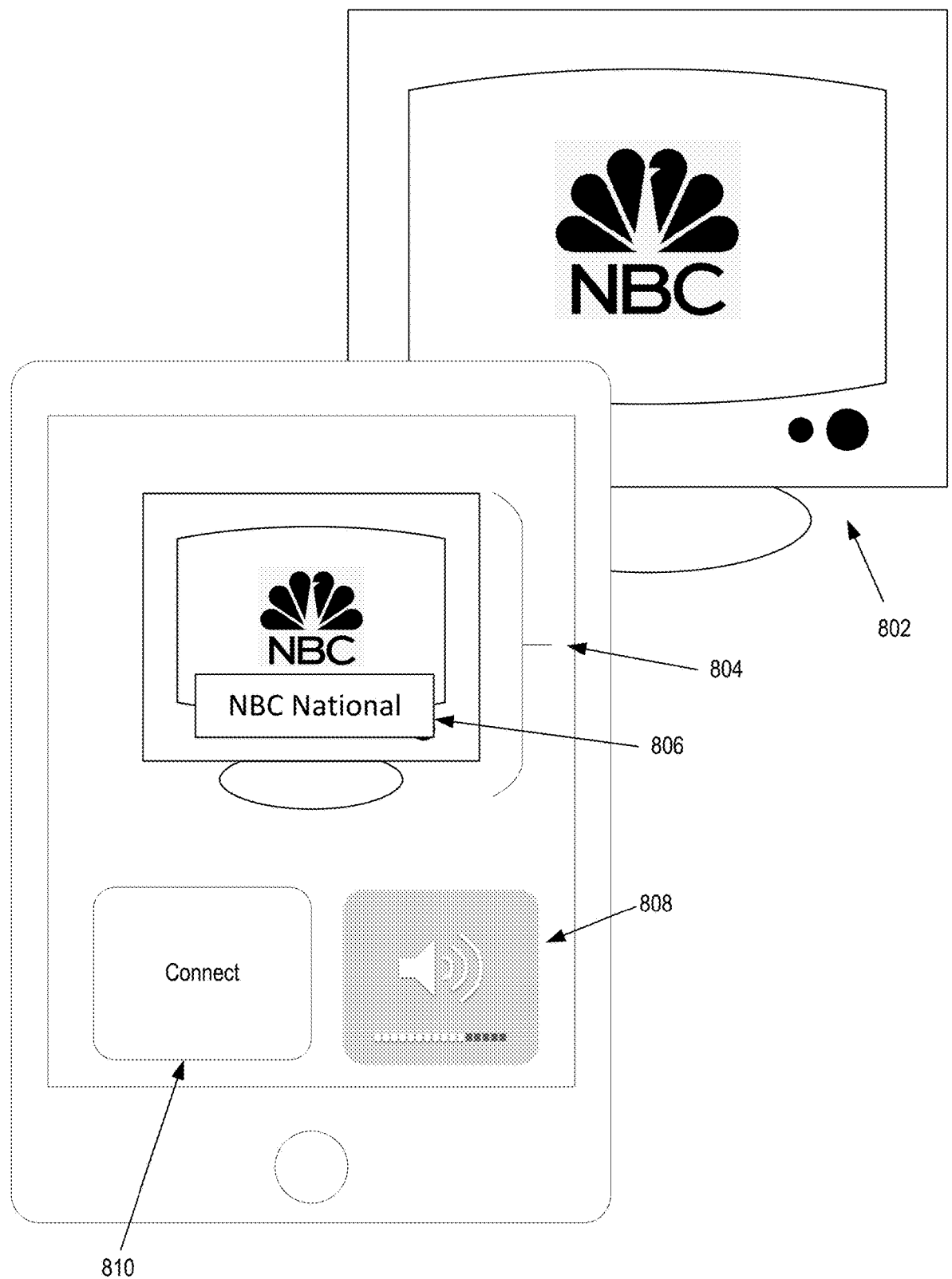

Also or alternatively, the user may be prompted to capture an image of a portion of a video being output via one of the display devices of the premises (e.g., as in step 704). For example, a user interface of the application may inform the user that if the user would like to tune into an audio for a video being output via a display device, the user may cause a user device to scan or capture an image of a video being output via the display device. An example of the user interface is shown in FIG. 8 and will be described herein. The user, desiring to hear the audio for a video being output via one of the display devices of the premise may cause the user device to direct its camera to the display device outputting the video. The captured image may include an indicator, which may comprise a visible or an imperceptible data indicating or revealing one or more network IDs. Each of the one or more network IDs may be for a wireless network transmitting an audio content corresponding to the content item for which the video is being output by the display device. Also or alternatively, the indicator may comprise data indicating an association between a wireless network and an audio data track of the video being output at the display device. The captured image of the portion of the video for the content item may be processed to extract an indicator that indicates the association between one or more wireless networks with one or more audio data tracks corresponding to the video. The indicator (e.g., Quick Response (QR) code, barcode, digital watermark, and/or metadata, etc.) may lead the user to the display of one or more network IDs corresponding to the one or more wireless networks corresponding to the one or more audio data tracks for the video (e.g., as in step 708). For example, after the user causes his or her user device to scan an image of a video output of a desired TV show, the user device 125, at step 708, may present a list of network IDs (e.g., SSIDs, indicators of IBSSs, wireless local area network names, wireless personal area network names, etc.) of wireless networks for audio of the TV show in different languages. The names of the network identifiers may indicate the language and other information associated with the content item or its associated audio, e.g., to facilitate selection.

The user device 125 may routinely monitor to see whether it has received a selection of a wireless network from the user (e.g., as in step 710). The selection may be based on a user input indicating a network ID from the displayed list of network IDs that represent the wireless networks transmitting the audio data tracks. After the user device has received the selection, the user device may send an indication of the selected wireless network and information identifying the user device ("user device information") to the computing device 200 performing one or more steps of the method 600. By receiving this indication, the computing device 200 may facilitate the transmission of the requested audio data track to the user device 125 over the wireless network represented by the network ID. For example, the user device 125 may be authorized by a computing device 200 (e.g., the dynamic network ID server or the audio transmissions device 117) to join the wireless network represented by the selected network ID (e.g., as in step 714). Furthermore, the computing device 200 may be able to use the received user device information to address any issues that may arise. For example, the computing device 200 may be able to remedy issues related to timing discrepancy (e.g., as in steps 628-634) based on the user device identification and the selected wireless network.

After the user device 125 has joined the selected wireless network (e.g., as in step 714), the user device 125 may receive an audio data track for the desired audio through the joined wireless network (e.g., as in step 716). Since the received audio data and the video being output via the display device correspond to the same content item, the audio data track may be synchronized with the video being output. Furthermore, the computing device 200 may periodically test to ensure the synchronization of the audio data track transmitted to the user device 125 with the video being output via the display device. For example, one or both of the video data track of the content item received by the display device or the audio data track of the content item received by the user device 125 may be delayed, e.g., due to connectivity issues. A computing device 200 (e.g., the gateway 111) may interrupt or buffer the delivery of one or both of the video data track or the audio data track to ensure synchronization. Also or alternatively, another computing device 200 (e.g., push server 105 or content server 106) may use the interruptions or buffering to deliver advertisements over the wireless network to the user device 125. A user may be able to listen to the desired audio for a video being output via a display device at the premises using the received audio data track (e.g., as in step 718). The audio may be output via an audio player or like program that generates the audio from the received audio data track. The audio player may be supported by the application of the user device 125.

FIG. 8 shows an example user interface of a user device used to select and access audio using dynamic network identification. A user may have encountered one or more display devices within the premises showing one or more content items on mute or low volume. The user may desire to hear the audio for a content item. The user may be instructed, e.g., via a mobile application, to cause the user device to scan, record, or otherwise capture a video output associated with the content item for which the audio is desired. For example, the mobile application may instruct the user to scan a display device showing a television program that the user is interested in hearing the audio for. The user may point the camera of his or her user device towards the video display of the display device. The camera may automatically become activated by the mobile application to scan the video output via the display device.

The mobile application may be hosted or managed by the application server 107 and may utilize and generate an interactive user interface. As explained previously, the video output via the display device may include an invisible or hidden indicator (e.g., metadata). The invisible or hidden indicator scanned via the camera of the user device may trigger the creation of an augmented reality. For example, the application server 107 may process the indicator and determine an identifier of the content item for which video is output. The determined identifier may be displayed via the user interface, as an augmented reality of the field of view.

As shown in FIG. 8, the user interface may display an augmented reality of the field of view of a camera on the user device 125 (e.g., camera 216). The field of view captured by the camera may include a display device 802 located within the premises. A video may be output via the display device and may be associated with a content item. The user interface may display the captured field of view, including the video output via the display device 802 (e.g., see marker 804). The augmented reality shown via the user interface may augment the video output via the display device 802 with an identifier of a content item associated with the video output (e.g., as shown in identifier 806 labeled as "NBC National"). The identifier may indicate, for example, one or more of: a portion of a title for the content item, descriptive information for the content item, a genre for the content item, a service associated with provision of the content item, an application associated with the content item, a content advisory for the content item, a language of audio of the content item, or a programming channel associated with the content item. As shown in FIG. 8, the video output shown in the user interface has been augmented with an identifier 804 that indicates the programming channel of the content item (e.g., "NBC National").

The mobile application may also provide an option to the user, via the user interface, to connect to a wireless network that transmits an audio data track associated with the content item (e.g., as shown by marker 810 pointing to an user interface functionality labeled "Connect"). The option may be referred to herein as "connect functionality" for convenience. Furthermore, each content item, for which video is output via display device 802 may be associated with a plurality of audio data tracks (e.g., for audio in various languages). Selecting the connect functionality may present the user with further options, such as selecting one of a plurality of audio options associated with the content item. Also or alternatively, a user may hold (e.g., press firmly for a predetermined duration) the connect functionality to be presented with these further options. The audio options may correspond to audio data tracks transmitted across different wireless network channels, as explained previously. Furthermore, as will be explained in relation to FIGS. 9A and 9B, the various options may be labeled with network IDs for easy recognition by the user. By selecting an option, the user may listen to audio corresponding to the audio data track transmitted via a wireless network. The user may enhance his or her experience viewing the video output of a content item via the display device 802, by listening to the audio associated with the content item through his or her user device. While the user is tuned into an audio data track for a content item, a volume control bar 808 may allow the user to control the volume of the audio content. In the premises, the user may listen to the audio generated via the audio data track using an audio listening device 215 e.g., so as not to disturb other users.

FIGS. 9A and 9B shows example user interfaces of a user device used to select and access audio using dynamic network identification. Like the user interface shown in FIG. 8, the user interfaces shown in FIGS. 9A and 9B may be generated by a mobile application hosted or managed by the application server 107 and running on the user device 125 associated with a user inside the premises 102a. Also or alternatively, the user device 125 may use existing functionality of the user device to detect and join wireless network channels carrying audio data, while allowing users to identify wireless network channels by their network IDs that were generated using methods previously discussed. The user may have encountered one or more display devices within the premises showing one or more content items on mute or low volume. The user may desire to hear the audio for a content item. The mobile application may instruct the user to select from a list of audio options corresponding to audio data, e.g., audio data tracks, transmitted across different wireless network channels. As shown in FIG. 9A, a list of network IDs 902A for these wireless network channels may indicate the audio data track that the wireless network channels transmit at certain times (e.g., 8:50 PM). For example, the network ID "ESPN—NFL: GB CHI—Eng" indicates that this is an audio data track in the English language for a National Football League (NFL) game where the Green Bay Packers are playing the Chicago Bears, and that the content item for the audio data track is being shown on ESPN TV channel. Both of the above described network IDs 912A indicate audio data tracks of a single content item (e.g., the NFL game where the Green Bay Packers are playing the Chicago Bears). As shown in FIG. 9A, two wireless networks are used to transmit the audio data tracks identified by the above described network IDs 912A.

FIG. 9B shows an example of reusing of wireless networks for transmission of other audio data tracks, and the renaming of the network IDs to reflect the other audio data tracks. For example, at another time (e.g., at 9:10 PM), a display device may cease output of video for a content item, and may begin output of video for another content item. For example, at 9:10 pm, as shown in in FIG. 9B, the NFL game between the Green Bay Packers and the Chicago Bears may end and a new NFL game between the New York Giants and the Philadelphia Eagles may begin. The video display may output video associated with the new NFL game. The two wireless networks previously used to transmit the audio data tracks associated with the content item of the NFL game between the Green Bay Packers and the Chicago Bears may, at 9:10 pm, transmit audio data tracks for the NFL game between the New York Giants and the Philadelphia Eagles. The identifiers 912B for the two wireless networks may thus be renamed to indicate the new audio data tracks being transmitted at 9:10 pm (e.g., "ESPN—NFL: NY PHI—Eng" for the English language audio of the NFL game between New York Giants and the Philadelphia Eagles, and "ESPN—NFL: NY PHI—Esp" for the Spanish language audio of the NFL game between New York Giants and the Philadelphia Eagles). The list of network IDs 902B that the user interface of the user device displays at 9:10 pm may thus be different as a result of the two above described wireless networks being reused for the different content item.

In another example, the network ID "ESPN—NBA: CLE BOS—Esp" signifies that this is an audio data track in the Spanish language for a National Basketball Association (NBA) game where the Cleveland Cavaliers are playing the Boston Celtics, and that the content item for the audio data track is also being shown on the ESPN TV channel. As can be seen from the examples of the network IDs listed, the naming of the network IDs may be based on the attributes of the content item, e.g., for easy recognition by the user.

The user interface may further present the option to connect to a wireless network channel (e.g., as in marker 906), in order to tune into the audio data track transmitted by the wireless network channel. Likewise, there may also be an option to disconnect from a wireless network channel that a user is already connected to (e.g., as in marker 904). While the user is tuned into an audio data track for a content item, a volume control bar 908 may allow the user to control the volume of the audio content. The user may listen to the audio generated via the audio data track using an audio listening device 215, e.g., so as not to disturb other users.

In some implementations, if a user desires to listen to an audio generated via an audio data track for a content item being shown on a display device, a user may also be prompted to scan an image of a video output via the display device (e.g., see marker 910). The scanning may capture a visible or invisible indicator that can allow the user to unlock additional network IDs. The indicator may provide the user permission to connect to a network ID for a wireless network channel already detected by the user device. Also or alternatively, as previously described in relation to FIG. 8, the scanning may involve causing a camera of the user device to create an augmented reality of the video output via the display device. Metadata associated with the video output via the display device may trigger the camera of the user device to display the augmented reality, for example, so that the video output is overlaid with information pertaining to the content item associated with the video output. Furthermore, the augmented reality may be a visible manifestation of an invisible indicator output along with the video via the display device. For example, the augmented reality displayed via the user interface may be a display of a network ID overlaid on the video output, whereas the video output shown on the video display of the display device may not show the network ID as it may be hidden as metadata output along with the video output.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A computing device comprising:
one or more processors; and
memory storing instructions that, when executed by the one or more processors, cause the computing device to:
receive video data for a content item, audio data for the content item, and metadata that comprises descriptive information for the content item;
generate, based on the metadata, a wireless network identifier that is descriptive of the content item, wherein the wireless network identifier comprises at least a portion of information from the metadata;
assign, to a wireless network, the wireless network identifier;
cause transmission, via the wireless network, during presentation of video based on the video data, and while the wireless network identifier is assigned to the wireless network, of the audio data; and
cause transmission, during the presentation of the video and the transmission of the audio data, of the wireless network identifier.

2. The computing device of claim 1, wherein the instructions, when executed by the one or more processors, further cause the computing device to:
assign, to the wireless network, a second wireless network identifier that is descriptive of a second content item;
cause transmission, via the wireless network, during presentation of second video for the second content item, and while the second wireless network identifier is assigned to the wireless network, of second audio data for the second content item; and
cause transmission, during the presentation of the second video and the transmission of the second audio data, of the second wireless network identifier.

3. The computing device of claim 1, wherein the metadata comprises one or more of:
program guide data;
content listing data;
program identifier data;
closed captioning data;
data identifying a service associated with the content item; or
temporal data associated with the content item.

4. The computing device of claim 1, wherein the instructions, when executed by the one or more processors, further cause the computing device to generate the wireless network identifier by causing the computing device to perform one or more of:
extracting information from one or more predefined fields of the metadata,
truncating text from the metadata, or
combining text from the metadata with additional text.

5. The computing device of claim 1, wherein the instructions, when executed by the one or more processors, further cause the computing device to assign the wireless network identifier as one of:
a service set identifier (SSID),
an indicator of an independent basic service set (IBSS),
a wireless local area network name, or
a wireless personal area network name.

6. The computing device of claim 1, wherein the instructions, when executed by the one or more processors, further cause the computing device to receive the video data by causing the computing device to receive second audio data for the content item, and wherein the instructions, when executed by the one or more processors, further cause the computing device to:
assign, to a second wireless network, a second wireless network identifier that is descriptive of the content item and is different from the wireless network identifier;
cause transmission, via the second wireless network, during presentation of the video for the content item, and while the second wireless network identifier is assigned to the second wireless network, of the second audio data; and
cause transmission, during the presentation of the video and the transmission of the second audio data, of the second wireless network identifier.

7. One or more non-transitory computer-readable media storing instructions that, when executed, cause:
receiving video data for a content item, audio data for the content item, and metadata that comprises descriptive information for the content item;
generating, based on the metadata, a wireless network identifier that is descriptive of the content item, wherein the wireless network identifier comprises at least a portion of information from the metadata;
assigning, to a wireless network, the wireless network identifier;
causing transmission, via the wireless network, during presentation of video based on the video data, and while the wireless network identifier is assigned to the wireless network, of the audio data; and
causing transmission, during the presentation of the video and the transmission of the audio data, of the wireless network identifier.

8. The one or more non-transitory computer-readable media of claim 7, wherein the instructions, when executed, further cause:
assigning, to the wireless network, a second wireless network identifier that is descriptive of a second content item;
causing transmission, via the wireless network, during presentation of second video for the second content item, and while the second wireless network identifier is assigned to the wireless network, of second audio data for the second content item; and causing transmission, during the presentation of the second video and the transmission of the second audio data, of the second wireless network identifier.

9. The one or more non-transitory computer-readable media of claim 7, wherein the metadata comprises one or more of:
program guide data;
content listing data;
program identifier data;
closed captioning data;
data identifying a service associated with the content item; or
temporal data associated with the content item.

10. The one or more non-transitory computer-readable media of claim 7, wherein the instructions, when executed, further cause the generating the wireless network identifier by causing one or more of:
extracting information from one or more predefined fields of the metadata,
truncating text from the metadata, or
combining text from the metadata with additional text.

11. The one or more non-transitory computer-readable media of claim 7, wherein the instructions, when executed, further cause assigning the wireless network identifier as one of:
a service set identifier (SSID),
an indicator of an independent basic service set (IBSS),
a wireless local area network name, or
a wireless personal area network name.

12. The one or more non-transitory computer-readable media of claim 7, wherein the instructions, when executed, further cause the receiving the video data by causing receiving second audio data for the content item, and wherein the instructions, when executed, further cause:
assigning, to a second wireless network, a second wireless network identifier that is descriptive of the content item and is different from the wireless network identifier;
causing transmission, via the second wireless network, during presentation of the video for the content item, and while the second wireless network identifier is assigned to the second wireless network, of the second audio data; and
causing transmission, during the presentation of the video and the transmission of the second audio data, of the second wireless network identifier.

13. A system comprising:
a computing device, and
a wireless network device;
wherein the computing device is configured to:
receive video data for a content item, audio data for the content item, and metadata that comprises descriptive information for the content item;
generate, based on the metadata, a wireless network identifier that is descriptive of the content item, wherein the wireless network identifier comprises at least a portion of information from the metadata;
assign, to a wireless network, the wireless network identifier;
cause transmission, via the wireless network, during presentation of video based on the video data, and while the wireless network identifier is assigned to the wireless network, of the audio data; and
cause transmission, during the presentation of the video and the transmission of the audio data, of the wireless network identifier; and
wherein the wireless network device is configured to:
receive the wireless network identifier.

14. The system of claim 13, wherein the computing device is further configured to:
assign, to the wireless network, a second wireless network identifier that is descriptive of a second content item;
cause transmission, via the wireless network, during presentation of second video for the second content item, and while the second wireless network identifier is assigned to the wireless network, of second audio data for the second content item; and
cause transmission, during the presentation of the second video and the transmission of the second audio data, of the second wireless network identifier.

15. The system of claim 13, wherein the metadata comprises one or more of:
program guide data;
content listing data;
program identifier data;
closed captioning data;
data identifying a service associated with the content item; or
temporal data associated with the content item.

16. The system of claim 13, wherein the computing device is configured to generate the wireless network identifier by one or more of:
extracting information from one or more predefined fields of the metadata,
truncating text from the metadata, or
combining text from the metadata with additional text.

17. The system of claim 13, wherein the computing device is configured to assign the wireless network identifier as one of:
a service set identifier (SSID),
an indicator of an independent basic service set (IBSS),
a wireless local area network name, or
a wireless personal area network name.

18. The computing device of claim 13, wherein the computing device is configured to receive the video data by receiving second audio data for the content item, and wherein the computing device is further configured to:
assign, to a second wireless network, a second wireless network identifier that is descriptive of the content item and is different from the wireless network identifier;
cause transmission, via the second wireless network, during presentation of the video for the content item, and while the second wireless network identifier is assigned to the second wireless network, of the second audio data; and
cause transmission, during the presentation of the video and the transmission of the second audio data, of the second wireless network identifier.

* * * * *